US006457643B1

(12) United States Patent
Way

(10) Patent No.: US 6,457,643 B1
(45) Date of Patent: Oct. 1, 2002

(54) VOTING SYSTEM

(76) Inventor: Ian Way, 55 Derwent Crescent, Titirangi, Auckland (NZ), 1007

( * ) Notice: Subject to any disclaimer, the term of this patent is extended or adjusted under 35 U.S.C. 154(b) by 0 days.

(21) Appl. No.: 09/582,158

(22) PCT Filed: Dec. 22, 1998

(86) PCT No.: PCT/NZ98/00187

§ 371 (c)(1),
(2), (4) Date: Jul. 20, 2000

(87) PCT Pub. No.: WO99/33029

PCT Pub. Date: Jul. 1, 1999

(30) Foreign Application Priority Data

Dec. 22, 1997 (NZ) ............................................. 329465

(51) Int. Cl.[7] ............................................. G06K 7/10

(52) U.S. Cl. .................. 235/462.01; 235/386; 235/380; 235/435

(58) Field of Search ............................ 235/462.01, 386

(56) References Cited

U.S. PATENT DOCUMENTS

| | | | | | |
|---|---|---|---|---|---|
| 1,350,914 | A | | 8/1920 | Baker | |
| 3,708,656 | A | * | 1/1973 | Fielder | 235/61.12 R |
| 3,934,794 | A | * | 1/1976 | O'Neal | 235/54 A |
| 4,578,572 | A | * | 3/1986 | Hice | 235/462 |
| 4,717,177 | A | * | 1/1988 | Boram | 283/5 |
| 4,807,908 | A | * | 2/1989 | Gerbel | 283/5 |
| 4,813,708 | A | * | 3/1989 | Narey | 283/5 |
| 5,189,288 | A | * | 2/1993 | Anno et al. | 235/386 |
| 5,213,373 | A | * | 5/1993 | Ramos | 235/454 X |
| 5,260,550 | A | * | 11/1993 | Rapp et al. | 235/50 |
| 5,610,383 | A | * | 3/1997 | Chumbley | 235/386 |
| 5,754,657 | A | * | 5/1998 | Schipper et al. | 380/25 |
| 5,758,325 | A | * | 5/1998 | Lohry et al. | 705/12 |
| 5,875,432 | A | * | 2/1999 | Sehr | 235/386 X |
| 6,092,051 | A | * | 7/2000 | Kilian et al. | 380/28 |
| 6,250,548 | B1 | * | 6/2001 | McClure et al. | 235/51 |

FOREIGN PATENT DOCUMENTS

| | | | | |
|---|---|---|---|---|
| DE | 25 22 741 | A | | 12/1975 |
| DE | 40 00 134 | | | 7/1991 |
| JP | 407073254 | A | * | 3/1995 |
| JP | 09 212699 | | | 8/1997 |
| JP | 09 212699 | A | | 8/1997 |
| RU | 2010333 | | | 3/1993 |
| RU | 2010333 | C1 | | 3/1994 |

* cited by examiner

*Primary Examiner*—Michael G. Lee
*Assistant Examiner*—Daniel Walsh
(74) *Attorney, Agent, or Firm*—Brown, Martin, Haller & McClain, LLP

(57) ABSTRACT

This invention relates to a voting system. In particular, this invention relates to a ballot paper which includes an option section and response section, whereby the response section is adapted to be separable from the option section. The option section preferably contains at least two options, the options being generated and/or presented in random order, and the response section preferably includes at least one selection portion for each option presented on the option section. The response section preferably includes a unique identifier which may be utilized to identify each voter, and the response section may preferably include reading means adjacent each selection portion. Preferably a key such as a dongle may be required to produce the ballot paper and be required to count the votes and/or collate the results. A method of conduct a ballot utilizing such a ballot paper is also described.

11 Claims, 1 Drawing Sheet

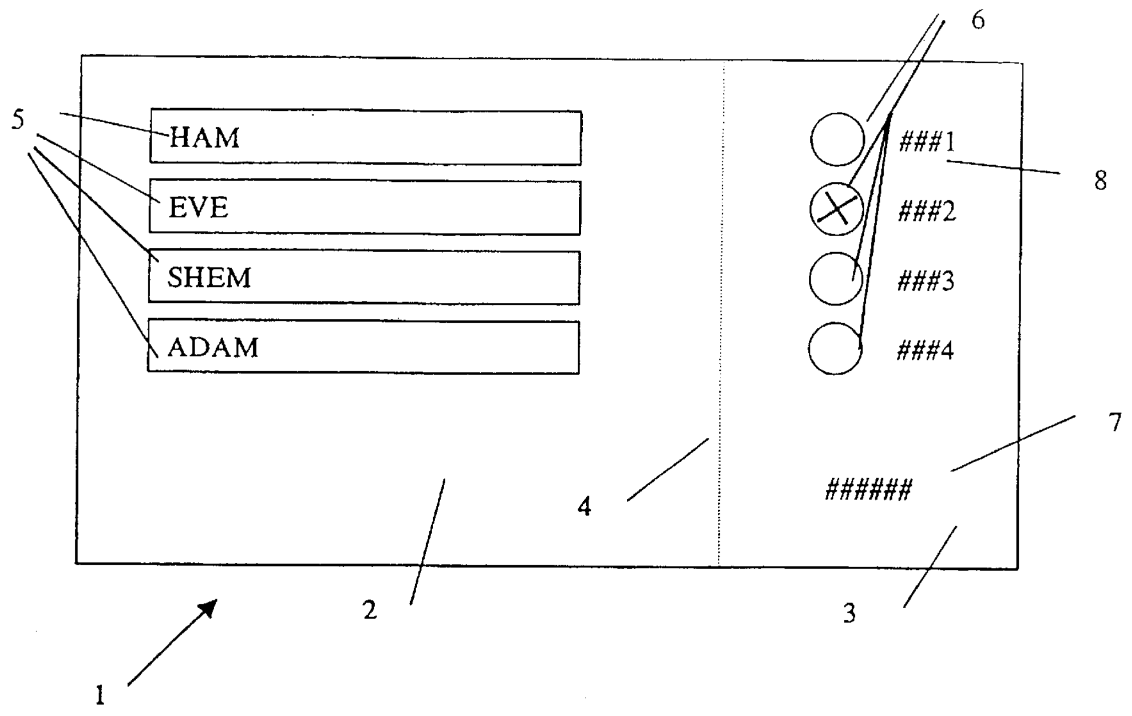
6
5
HAM
EVE
SHEM
ADAM
1
2
3
4
8
7

4
2
3
1

VOTING SYSTEM

TECHNICAL FIELD

This invention relates to improvements in or relating to voting systems.

However, it is to be appreciated that the invention is not to be limited as such, and the prior art and possible applications of the invention as discussed below are therefore given by way of example only.

BACKGROUND ART

Most countries are democracies, and as such are governed by their elected representatives. An important component of a democracy is the system by which representatives are elected.

For example, elections are usually held to elect representatives to Government or Parliament, and also to local government such as city councils. Another instance where a voting system is commonly used is in determining the will of the people with respect to various issues via a referendum.

A voting system or election is governed by two important precepts. The first is that it be an open and transparent process. The second is that the secrecy of the electors' vote is maintained. It is highly desirable that results are not available until the poll has closed. To ensure the secrecy of the results during a ballot it is illegal, in such countries, for example New Zealand, to commence processing of votes until the ballot has closed.

Elections or referenda are usually conducted by postal ballot or via a ballot box. In either method voters are provided with a ballot paper. Each voter's ballot paper is identical and identifies the issue(s) under consideration, and a number of options for the issue(s). If the options are candidates'names, these are usually listed in alphabetical order, or some other pre-determined, but fixed, sequence. Voters mark their preference on the ballot paper and return the ballot paper to the ballot organiser, either by mailing it, or placing it in a ballot-box.

When a postal ballot paper is received it is usually validated. The process of validation ensures that no voter casts more votes than he or she is entitled to. Usually a voter is allowed a single vote and is recorded as having cast that vote when their ballot paper is returned. If more than one ballot paper for a voter is returned, that voter's ballot papers are usually put aside and/or declassed invalid.

Usually, only when a ballot ends can the ballot papers be processed and the results of the ballot discovered. Often the results of a ballot are required the same day the ballot closes. It is an enormous undertaking to train and co-ordinate the number of people required to count and record the results of the ballot in the time available after the ballot has ended. It is also expensive. The effort and expense increase as the size and/or complexity of the ballot increases.

Efforts are being made in several countries to change the law so that votes can be processed as they are received. However the secrecy of the results before the ballot closes must usually still be maintained.

A problem with most current ballot papers is that the choice made by the voter is apparent on the face of the ballot paper, and the voter, in some instances, may be identified either by his or her name, or by an identification number.

When the identification number is used to validate the vote, the voter's identity is known. The sighting of the electors' choices, for example, may increase the risk that some indication of preliminary results may leak to the public.

Furthermore, the custom of placing options, and in particular candidate names in, say, alphabetical order can favour those candidates whose name appears early in the alphabetical sequence.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a ballot including an option section and a response section whereby the response section is adapted to be separable from the option section.

According to another aspect of the present invention there is provided a ballot paper substantially as described above wherein the response section is separable from the option section by a perforated join.

According to another aspect of the present invention there is provided a ballot paper substantially as described above wherein the option section contains at least two options, said options being generated and/or presented in random order.

According to another aspect of the present invention there is provided a ballot paper substantially as described above wherein the response section includes at least one selection portion for each option presented on the option section, to enable a voter to choose or nominate an option(s) or preference(s) or sequential order.

According to another aspect of the present invention there is provided a ballot paper substantially as described above wherein the response section includes a unique identifier.

According to another aspect of the present invention there is provided a ballot paper substantially as described above wherein the unique identifier is in the form of a barcode.

According to another aspect of the present invention there is provided a ballot paper substantially as described above wherein each selection portion on the response section is provided with a reading means.

According to another aspect of the present invention there is provided a ballot paper substantially as described above wherein the reading means is a barcode According to a further aspect of the present invention there is provided a method of conducting a ballot utilising a ballot paper substantially as described above, the method comprising the steps of:

a) printing the options onto the option section in random order;
b) presenting the ballot paper to a voter,
c) instructing the voter to indicate a preference(s) on the selection portion(s) of the response section,
d) instructing the voter to separate the response section from the option section, and return the response section to the ballot organiser;
e) using the unique identifier to identify the voter and recording that a vote has been cast by that voter;
f) recording the preference(s) of the voter;
g) collating the results According to a further aspect of the present invention there is provided a method of limiting access to the results of a ballot, utilising a ballot paper substantially as described above, the method comprising the steps of:

a) requiring a key to produce the ballot paper;
b) requiring a key to collate the results.

According to a further aspect of the present invention there is provided a method of limiting access to the results of a ballot, substantially as described above wherein the key is a dongle.

The ballot paper may be any suitable means of conducting a ballot and/or recording a vote, or preference.

In preferred embodiments the ballot paper may be made of paper or card.

In other embodiments the ballot paper may be presented electronically, for example on a visual display unit.

The option section on the ballot paper may present a number of options. In some embodiments the options may be a list of candidates in an electorate. In another embodiment there may simply be two options, a yes/no or true/false.

In preferred embodiments the options may be presented in a list.

The response section of the ballot paper may include at least one selection portion to enable a voter to choose or nominate an or each option(s) as desired. Preferably, there may only be one selection portion for each option.

In preferred embodiments the selection portion may be a space capable of being marked by pencil or by ink.

In an electronic embodiment the selection portion may be marked by entering data electronically on the selection portion by the keyboard, by clicking a mouse, or by other pointing device or by touch sensitive screens.

It is envisaged that a voter may choose or nominate an option by making an appropriate mark (for example a tick or an “X”) in the appropriate selection portion. In some ballots the voter may wish to indicate a sequential order of preference, that is by rating the options from most favored to least favored.

There may be provided two or more selection portions for each option in a ballot where, for example, there are more than one issues to be determined in respect of each option available.

The response section may preferably be adapted to be separable from the option section (and/or ballot paper).

In a preferred embodiment the response section and the option section may share a perforated joint for ease of separation.

In another embodiment the response section may be adapted to be separable from the option section by the use of scissors or some other kind of blade.

In some electronic embodiments the response section and option section may be separated automatically and electronically on indication by the user that they wish to cast their vote.

The option section may contain at least two options generated and/or presented in random order. For example the options may include the candidates' names Adam, Eve and Ham. One random order may be Adam, Eve, Ham, another may be Adam, Ham Eve, and another, Eve, Adam, Ham and so on. Hence, in the example given where there are three candidates they may be presented in six possible orders, that is not necessarily alphabetically.

In a preferred embodiment the order of presentation of the options may be applied randomly to each ballot paper.

The response section may preferably include a unique identifier.

The unique identifier may serve to identify the voter. In some embodiments the unique identifier may be a sequence of numbers.

In other embodiments the unique identifier may be a sequence of letters, and/or numbers.

In a preferred embodiment the unique identifier may be a bar code or other machine readable code.

In some embodiments the unique identifier may be generated randomly or automatically.

For example, the unique identifier may be generated from a combination of the voter's position in the electoral roll; and/or the time and date of issuing the ballot paper; and/or an independently generated number or external value.

Each selection portion may preferably be provided with a reading means. Preferably, each reading means may be particular or unique to only one selection portion.

The reading means may indicate the position of the selection portion(s) marked by the voter.

For example if the candidate options, in order of presentation, were Ham, Adam and Eve and the voter wished to select Eve, the voter may mark the selection portion corresponding to the position in which Eve appears, namely position No. 3. In preferential voting the voter may mark a series of selection portions in order of preference. In sequential (or transferable) voting the voter may select a first and second choice. If the first choice does not receive the majority of votes then the second choice may be counted.

The reading means may be a number, or a letter, or a combination of both.

In a preferred embodiment the reading means may be a barcode or other machine readable code.

The ballot organiser may include means by which the voter returns the response section, usually via the postal system, the ballot box or by electronic mail.

A key may be required to generate a ballot paper, and to count votes.

The key may be a hardware device used to validate and/or provide an externally generated value for a computer process. For example, the key may be a dongle.

The key, such as a dongle, may be attached to the external port of a computer before ballot papers can be produced. The key may contribute an external value to the generation of a unique identification number which appears on each ballot paper (particularly appropriate in postal ballots). If a ballot paper is lost or damaged a voter may require a replacement ballot paper. The unique identifier generated for the replacement ballot paper will be different from the original unique identifier because it will be generated at a different time. The original unique identifier will be invalidated. When the ballot has closed the key may again be attached to the external port of the computer so that the voter may be identified, and the position of candidates on that voter's ballot paper identified.

In some embodiments the key may be or require password access to the computer system.

It can be seen this invention provides a number of advantages over the present art.

For example, each vote is confidential. Only the response section of the ballot paper is returned to the ballot organiser. The voter's choice is not apparent because the option section has been removed and hence it is impossible to tell which option corresponds to the choice the voter has marked. This is because the options for each ballot paper are preferably generated and/or presented in a random order.

Furthermore the vote can be validated without the identity of the voter being apparent. The validity of the vote may be determined by the validity of the unique identifier. If the unique identifier is valid, the vote is valid. If the unique identifier is invalid, the vote also is invalid.

It is possible to begin processing ballot papers as they are received without determining the progress of the result. The information can be collected, but the key, or dongle, is required before the information can be processed and the results made available.

Accordingly, the present invention allows ballot papers to be processed as they are received while preserving the secrecy of the results before the ballot closes. It is only once the ballot closes that the dongle may be attached to the system and the results determined. This reduces the effort and expense in only being able to process the results of a vote after the ballot has closed.

Moreover, it may assist in changing law in countries which currently forbid processing of ballot papers until the ballot closes.

Furthermore the present invention negates the favourable position that candidates enjoy if they appear early in an option sequence. All options are presented randomly. Hence voters who tend to select options early in the sequence will not be skewing the results.

It is to be understood and appreciated that the ballot paper, being the subject of the present invention, may include an electronic ballot paper. That is, a ballot paper which is transmitted to a voter electronically, for example via the internet or e-mail system. In such an embodiment, the voter may indicate his/her preference(s) on the response section as described previously, and return same electronically. The option section may be retained and not retransmitted electronically.

BRIEF DESCRIPTION OF DRAWINGS

Further aspects of the present invention will become apparent from the following description which is given by way of example only and with reference to the accompanying drawing which is a view of a ballot paper being one possible embodiment of the present invention.

BEST MODES FOR CARRYING OUT THE INVENTION

Referring to the drawing, there is illustrated a ballot paper 1 including an option section 2 and a response section 3. The ballot paper 1 is made from paper. The response section 3 may be separated from the option section 2 and/or ballot paper 1 along the perforation 4. The option section 2 includes a list of options 5 presented in random order. The response section 3 includes a selection portion 6 for each option 5 presented on the option section 2 to allow a voter to choose or nominate an option.

In use, a voter may receive the ballot paper 1, select the option 5 they wish to choose so marking the appropriate selection portion 6, separate the response section 3 from the option section 2 via the perforation 4 and return the response section 3 to the ballot organiser.

The response section 3 has a unique identifier 7 which identifies the ballot paper, and the voter to whom the ballot paper was issued. The unique identifier is a multi-digit number that is presented as a bar code which includes Arabic numerals. The unique identifier 7 is generated from the voter's position on the electoral roll, the date and time the ballot paper was issued, and an external value contributed by a dongle (not shown).

For example, in the drawing, the options 5 include Ham, Eve, Shem, and Adam. The voter has marked Eve, the candidate appearing in position 2. The voter returns only the response section 3 to the ballot organizer. The voter's choice is not apparent from the response section 3. Only the position of the option 5 selected by the voter is apparent.

The unique identifier can identify the order of candidates on the ballot paper but the dongle must be present to contribute the external value.

The response section 3 has a reading means 8 capable of identifying the position of the marked selection portion 6. As soon as the response section 3 is received by the ballot organiser from the voter, the unique identifier 7 and the reading means 8 of the marked selection portion 6 can be recorded. The unique identifier and/or reading means can be keyed in, or the bar code "swiped" in. Machine readable code technology such as barcodes are well known and do not need to be described herein in any further detail.

The dongle is not present and therefore the reading of the unique identifier and/or reading means does not identify either the voter, the order of the options 5 on the ballot paper, or the selection made by the voter.

When the ballot closes the dongle is attached to the system. The dongle provides the external identifier required to decode the unique identifier and determine the voter, and the order of options 5 on the ballot paper. The selection portion marked by the voter will correlate to an option 5. For example position 2 correlates to candidate Eve. The votes can then be counted.

It therefore follows that it is possible to being processing ballot papers as they are received without determining the progress of the result. That is, the information from reading the unique identifier and/or reading means can be collected, but the dongle is required before the collected (and/or stored) information can be "decoded" and/or processed and the results made available. However, the use of the dongle and/or computer related technology enables the information collected to be decoded and/or processed very rapidly, and hence the result of the ballot may be readily known in a substantially short period of time.

Aspects of the present invention have been described by way of example only and it should be appreciated that modifications and additions may be made thereto without departing from the scope thereof as defined in the appended claims.

The claims defining the invention are:

1. A ballot paper, comprising:

an option section containing at least two options, said options being generated and/or presented in random order; and a response section separable from the option section, the response section including at least one selection portion for each option presented on the option section, to enable a voter to nominate at least one option or preference or sequential order of options.

2. A ballot paper as claimed in claim 1, wherein the response section is separable from the option section by a perforated joint.

3. A ballot paper as claimed in claim 1, wherein each at least one selection portion is provided with a reading means.

4. A ballot paper as claimed in claim 3 wherein the reading means is a machine readable barcode.

5. A ballot paper, comprising:

an option section containing at least two options, said options being generated and/or presented in random order;

a response section separable from the option section, the response section including at least one selection portion for each option presented on the option section, to enable a voter to nominate at least one option or preference or sequential order of options; and the response section including an unique identifier for counting votes and/or collating results.

6. A ballot paper as claimed in claim 5 wherein the unique identifier is a machine readable barcode.

7. A ballot paper as claimed in claim 5 or claim 6 wherein the unique identifier is generated from a voter's position on an electoral roll, the date and time the ballot paper was issued, and an external value contributed by a key.

8. A ballot paper as claimed in claim 7 wherein the key is a dongle.

9. A method of conducting a ballot utilizing a ballot paper which includes an option section and a response section, the method comprising the steps of:

a) printing the options onto the option section in random order;

b) presenting the ballot paper to a voter;

c) instructing the voter to indicate one or more preference on a selection portion included on the response section;

d) instructing the voter to separate the response section from the option section, and return the response section to the ballot organizer;

e) using a unique identifier to identify the voter and record that a vote has been cast by that voter;

f) recording the preference(s) of the voter; and g) collating the results.

10. A method of conducting a ballot utilizing a ballot paper which includes an option section and a response section, the method comprising the steps of:

a) printing the options onto the option section in random order, wherein a key is required to produce the ballot paper;

b) presenting the ballot paper to a voter;

c) instructing the voter to indicate one or more preferences on a selection portion included on the response section;

d) instructing the voter to separate the response section from the option section, and return the response section to the ballot organizer;

e) using a unique identifier to identify the voter and record that a vote has been cast by that voter;

f) recording the preference(s) of the voter; and g) using a key which is used in producing the ballot paper to count the votes and/or collate the results.

11. a method of conducting a ballot as claimed in claim 10 wherein the key is a dongle.

* * * * *